April 17, 1962  F. E. SWAIN  3,030,066
BUTTERFLY VALVES
Filed Oct. 20, 1958  2 Sheets-Sheet 1

INVENTORS
FRANK E. SWAIN
Norris & Bateman
ATTORNEYS

April 17, 1962   F. E. SWAIN   3,030,066
BUTTERFLY VALVES
Filed Oct. 20, 1958   2 Sheets-Sheet 2
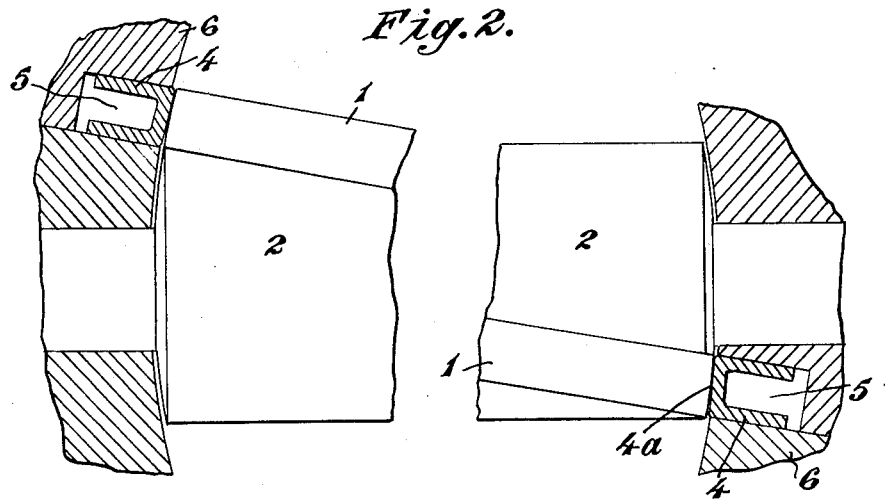
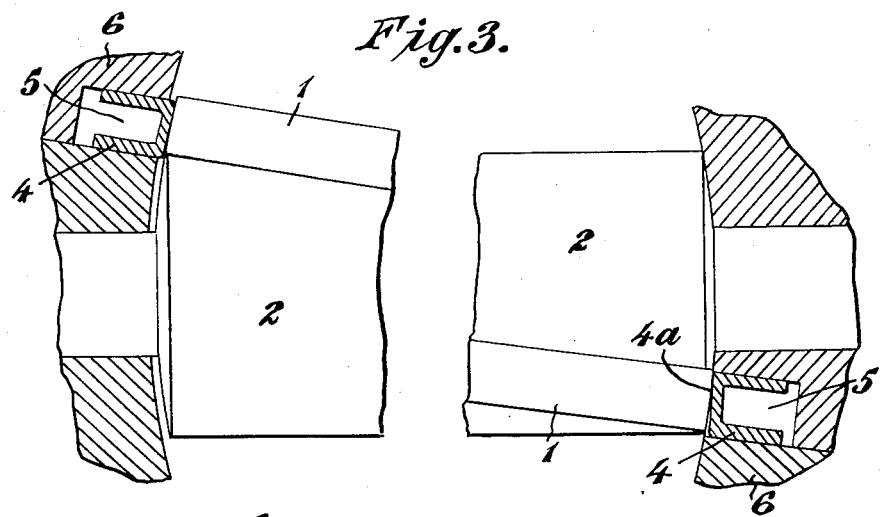
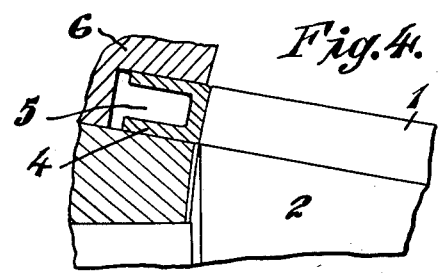
INVENTOR
FRANK EDWARD SWAIN
Norris & Bateman
ATTORNEYS 3,030,066
BUTTERFLY VALVES
Frank Edward Swain, Kirby, Muxloe, near Leicester, England, assignor of one-half to David F. Wiseman & Sons Limited, Birmingham, England, a British company
Filed Oct. 20, 1958, Ser. No. 768,417
Claims priority, application Great Britain Oct. 24, 1957
9 Claims. (Cl. 251—164)

This invention has reference to a butterfly valve wherein a closure member is mounted for pivotal movement within the bore of a valve body about an axis of rotation which is angularly offset in relation to the plane containing the sealing edge of the closure member, and wherein the closure member co-operates with a radially expansible seating ring which is freely mounted in the bore of the valve body. An example of such a butterfly valve is disclosed in the specification of the concurrent patent application Serial No. 768,418 filed October 20, 1958.

The present invention has for its object to provide novel and effective means for moving the closure member bodily into and out of the plane of the seating ring for effecting a sealing engagement of these parts.

The invention consists of a butterfly valve wherein a closure member is mounted in a valve body for rotation about an axis which is inclined to the plane of a radially expansible seating ring mounted, with provision for floating movement in the plane of the ring, in a recess in the valve body for sealing engagement with the periphery of the closure member, characterized by the provision of means for displacing the closure member in the direction of its axis of rotation thereby to effect bodily movement of the closure member into or out of tight engagement or disengagement of the closure member with the seating ring. These and other objects of the present invention will become more fully apparent by reference to the appended claims and as the following detailed description proceeds in reference to the accompanying drawings wherein:

FIGURE 2 is an enlarged plan view partially in cross-section of a butterfly valve according to a further embodiment of the present invention and illustrating the bore through the valve seating ring to be partially conically-shaped.

FIGURE 3 is a view similar to FIGURE 2 but showing the closure member shifted slightly to the right so that the closing member wedges with and is in tight engagement with the sealing ring.

FIGURE 4 is an enlarged fragmentary plan view partially in cross-section of the valve of FIGURE 1 and showing the closure member to be wedged in tight engagement with the seating ring.

Figure 1:
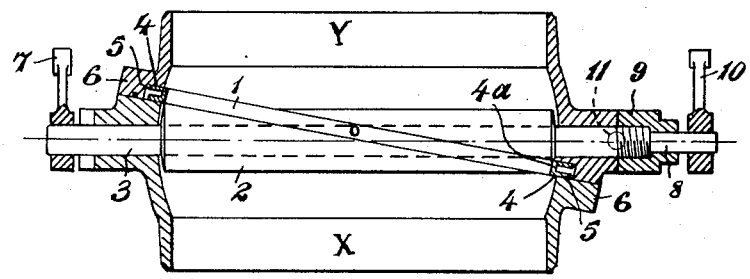
FIGURE 1 is a partially sectioned plan view according to a preferred embodiment of the present invention and illustrating a butterfly valve wherein the bore through the valve seating ring is shown to be partially spherically shaped.

Preferred means for carrying the invention into practice will now be described with reference to the accompanying drawings which illustrate in part-sectional plan views one example of a butterfly valve assembly in accordance with the invention.

In the butterfly valve seen in FIGURES 1 and 4, the closure member comprises a valve plate 1 the sealing edge whereof takes the form of a frustum of a sphere, and an angularly offset cylindrical housing 2 which is mounted on a shaft 3 whereby the valve plate can be rotated through 90 degrees about a hypothetical sphere which diameter is angularly offset to the plane of the frustum.

The part-spherical sealing edge of the valve plate co-acts with a radially expansible continuous seating ring which is located substantially in the plane of the valve plate 1 in the closed position of the valve, and is mounted within an annular recess 5 provided in the valve body 6, in which recess the ring is permitted to float in a radial direction, i.e., in the plane of the ring. By the aforesaid construction one half of the ring 4 and the plate 1 is located forwardly of the axis of rotation of the closure member whereas the opposite half of the ring and plate is located rearwardly of the axis of rotation so that the presence of the seating ring does not interfere with the bearings of the closure member.

In the following description the terms "forwardly" and "rearwardly" refer to the upstream and downstream sides of the valve marked X and Y respectively in the drawing, although it is to be realized that in some applications the position of the valve assembly may be reversed.

In order to obtain the requisite co-action between the sealing edge of the valve plate 1 and the bore of the resilient ring 4 the plane of the front and the larger face of the part-spherical valve plate passes at an acute angle through the centre-point O of the axis of rotation of the valve plate, i.e., through the centre of the hypothetical sphere, and the seating surface of the ring 4 also takes the superficial form of the hypothetical sphere in the plane of the valve plate in its closed position.

Alternatively as best shown in FIGURES 2 and 3, the bore of the seating ring may be of frusto-conical formation to secure line contact between the sealing surfaces. In the case of a spherically formed seating ring, it will be appreciated that when the centres of curvature of the part-spherical sealing surfaces of the valve plate 1 and the unstretched ring 4 coincide the valve plate may be freely rotated into and out of the plane of the ring without substantial interference therebetween.

In the case of a conically formed ring bore the plate is freely rotatable from a plane wherein the diameter of the cone is slightly larger than the diameter of the plate.

In the illustrated example the housing 2 which carries the valve plate is fixedly mounted on its shaft 3 for movement therewith and the ends of the shaft are freely rotatably mounted in bearing apertures in the valve body. One end of the shaft 3 is provided with a control lever 7 for effecting the rotation of the plate 1 relative to the ring 4. The opposite end of the shaft 3 takes a bearing against the end of an axially aligned shaft displacing rod 8 having screw threaded engagement of a coarse nature with a bearing sleeve 9 rigidly secured to the valve body. The shaft displacing rod is provided with a control lever 10 whereby the rod may be rotated within its bearing 9 to effect an axial movement of the rod which is imparted to the closure member shaft whereby the member can be displaced transversely relative to the valve body 6. Desirably an anti-friction thrust ball 11 is interposed between the adjacent ends of the shaft 3 and rod 8.

In operation the valve plate 1 can be rotated from its open position into the plane of the seating ring 4 by angular movement of the lever 7 whereby the plate is caused to loosely engage the ring. When the valve plate has been brought into the plane of the ring, then, by rotating the shaft displacing rod 8 by means of the lever 10 in a direction tending to withdraw the rod from the adjacent end of the shaft 3, the pressure of liquid bearing on the forward face of the valve plate provides a component of force on the valve plate in the direction of its axis of rotation whereby the valve plate is displaced bodily along this axis. This transverse movement of the valve plate is followed by the seating ring by reason of the interengagement of these parts and the permitted floating movement of the ring in its recess; since however the movement of the ring is constrained to a plane which is angularly offset to the direction of movement of the valve plate, the sealing edge of the valve plate will be caused to forcibly enter further into the ring in the downstream direction thereby to effect a wedge-like engagement between these parts whereby the ring is somewhat stretched and a highly effective seal is produced therebetween. Thus by the above operation it will be realized that after the closure member has been rotated into the plane of the seating ring, movement of the closure member is then effectuated along its axis of rotation as best shown in FIGURES 2 and 3. This movement of the closure member along the axis of rotation is followed by the seating ring in its offset plane and results in a component of movement of the closure member which is normal to the plane of the seating ring so as to make or break a wedging seal between the periphery of the closure member and the inner periphery of the seating ring.

In order to open the valve, the lever 10 is turned to impart an axial movement to the rod 8 and shaft 3 in a direction resulting in the forcible extraction of the valve plate 1 from the ring 4 whereafter the valve plate may be rotated through 90 degrees to open the valve by rotation of the lever 7.

The control levers 7 and 10 associated with the shaft 3 and rod 8 respectively may be operated independently or in unison.

The ring 4 employed in the valve hereinbefore described is generally of the kind described in the specification of application Serial No. 768,418, and is adapted to be radially expanded when tightly engaged by the closure member.

With a view to providing a limited degree of resilience in the ring in its axial direction the ring may be modified as shown in the accompanying drawing by the provision in its outer face of a recess 4a giving a somewhat U-shaped section to the ring which admits of a limited axial movement of the internal or sealing edge of the ring relative to its web-like sides. In practice, the ring is mounted in its recess in the valve body with the sides of the ring slightly compressed. The seating ring is mounted in its recess in the valve body by splitting the valve body in a plane containing the recess, the two parts of the valve body being secured together in use by bolts.

It will be appreciated that means other than the above-mentioned shaft displacement rod 8 may be employed for effecting transverse movement of the valve plate relative to the valve body without departing from the scope of the invention. For example, an end of the shaft on which the closure member is mounted can be coupled to a fluid operated ram for effecting the requisite displacement. Alternatively the shaft 3 may itself have screw threaded engagement of a coarse character with the surrounding bearing surfaces of the valve body so that rotation of the shaft is accompanied by transverse displacement.

I claim:
1. A butterfly valve comprising a valve body having a bore providing a fluid passageway, a closure member mounted for rotation about a pivot axis extending across said bore, the body having a recess extending continuously around the inner periphery of said bore and disposed in a plane which is angularly offset relatively to said pivot axis of the closure member so that said pivot axis passes through the plane of said recess, and a radially resilient seating ring freely mounted for radial movement in said recess with its inner periphery adapted for coaction with the periphery of said closure member, said inner periphery having an annular surface portion which is smaller in diameter than the peripheral surface of said closure member, means for rotating said closure member between a valve open position and a valve closed position where it coacts with said seating ring, and means for displacing said closure member along its pivot axis, said displacement providing for bodily shift of said closure member with a component of movement normal to the plane of said recess and into tight sealing engagement with said seating ring surface portion and the coacting peripheral surfaces of said closure member and said seating ring being so dimensioned as to provide for increased sealing engagement upon displacement of said closure member in one direction along the axis of said bore.

2. A butterfly valve according to claim 1, wherein the co-acting peripheral surfaces of the closure member and seating ring are of spherical formation having substantially equal curvature.

3. A butterfly valve according to claim 1, wherein one of the co-acting peripheral surfaces of the closure member and seating ring is spherical and the other is of conical formation.

4. A butterfly valve according to claim 1, wherein the seating ring is a radially outwardly opening U-shaped section to confer resilience in the ring in the direction of its axis.

5. The butterfly valve as defined in claim 1, wherein said ring and said closure member are provided with cooperating seating surfaces contoured to establish a loose engagement of said closure member with said ring when said closure member is rotated into the plane containing said ring and the closure member being urged by upstream fluid pressure into said tight engagement with said annular surface portion upon said displacement of the closure member in the direction of its pivot axis.

6. The butterfly valve as defined in claim 1, wherein said ring is disposed in said recess so that the entire outer periphery of said ring is in unconfined radial relationship with respect to said recess to permit said ring to follow said closure member as said closure member is displaced along its pivotal axis.

7. A butterfly valve according to claim 1 wherein said means mounting the closure member for rotation about its pivot axis comprises a shaft on which said closure member is rigidly mounted rotatably mounted in said body, and said means for displacing the closure member along its pivot axis comprising means mounting said shaft for axial displacement along said axis.

8. A butterfly valve as defined in claim 7, wherein said means for displacing said closure member further comprises means provided in the body at one end of said shaft for longitudinally adjusting said shaft.

9. A butterfly valve according to claim 7, wherein said means for displacing said closure member further comprises a rod threaded in said body with one end in abutment with one end of the shaft so that rotation of the rod controls the displacement of the closure member.

References Cited in the file of this patent
UNITED STATES PATENTS

| | | |
|---|---|---|
| Re. 17,022 | Wilson | July 3, 1928 |
| 1,318,001 | Upson | Oct. 7, 1919 |
| 1,977,351 | Phillips | Oct. 16, 1934 |
| 2,754,846 | Ray | July 17, 1956 |
| 2,934,312 | Stevens | Apr. 26, 1960 |